Nov. 4, 1930. A. MESSER 1,780,563
APPARATUS FOR SEPARATING LIQUIDS INTO CONSTITUENTS POSSESSING
A LOW BOILING POINT AND CONSTITUENTS POSSESSING A HIGH
BOILING POINT BY DISTILLATION AND RECTIFICATION
Filed Nov. 9, 1925    2 Sheets-Sheet 1

Nov. 4, 1930.  A. MESSER  1,780,563
APPARATUS FOR SEPARATING LIQUIDS INTO CONSTITUENTS POSSESSING
A LOW BOILING POINT AND CONSTITUENTS POSSESSING A HIGH
BOILING POINT BY DISTILLATION AND RECTIFICATION
Filed Nov. 9, 1925   2 Sheets-Sheet 2
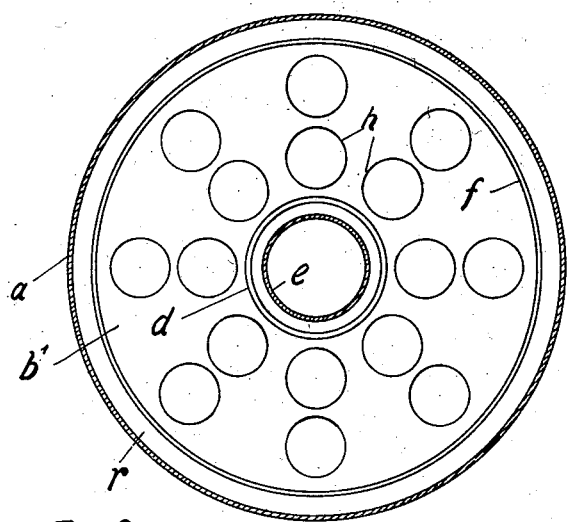
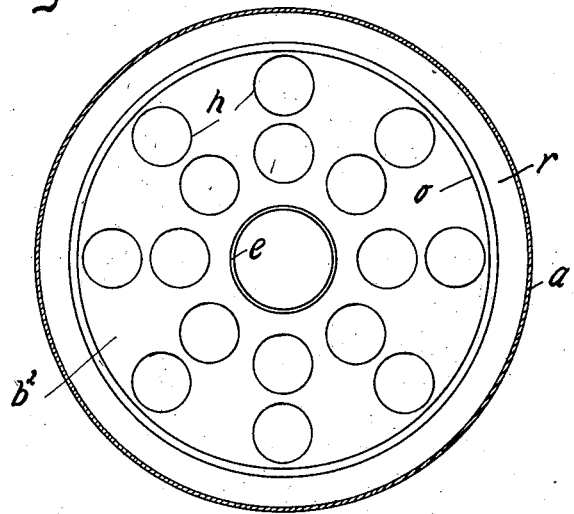
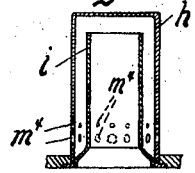 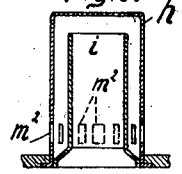 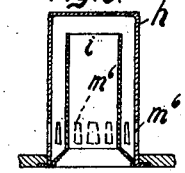 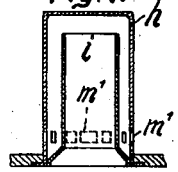 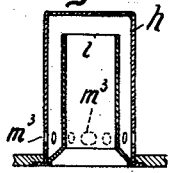

Patented Nov. 4, 1930

1,780,563

UNITED STATES PATENT OFFICE

ADOLF MESSER, OF FRANKFORT-ON-THE-MAIN, GERMANY

APPARATUS FOR SEPARATING LIQUIDS INTO CONSTITUENTS POSSESSING A LOW BOILING POINT AND CONSTITUENTS POSSESSING A HIGH BOILING POINT BY DISTILLATION AND RECTIFICATION

Application filed November 9, 1925, Serial No. 67,848, and in Germany November 15, 1924.

This invention has for its object to solve the problem of separating liquids by distillation and rectification into constituents possessing a low boiling point and constituents possessing a high boiling point. In order that such separation may be possible temperature differences must exist in the separation columns (reaction towers) commonly used for this purpose. At the evaporation of the constituents of the liquid which possess a low boiling point portions of the constituents which possess a high boiling point are, however, drawn along. In order to separate these drawn along particles the vapours produced must pass in extremely fine repartition through the liquid flowing in counter-current. In the commonly used separation columns two inconveniences may happen, i. e., the carrying over of liquid from one column bottom to the next higher column bottom, and further that the vapours do not encounter everywhere the same resistance, i. e., do not find everywhere the same liquid pressure but a lower pressure. At the points at which the pressure is lower more vapours will pass in a time unit than at the other points whereby the required uniform contact with the liquid is disturbed. In any case the degree of efficiency of the column bottoms and consequently that of the separation column will be diminished in both cases as, when liquid is carried along by the vapours, liquid possessing a higher distilling degree comes in contact with liquid of lower distilling degree. When, however, vapours which have not come into contact with liquid and are "unwashed" mix with vapours of the next higher bottom, the vapours on this bottom and consequently also the liquid on this bottom are changed for the worse as regards state.

These phenomena are based on the law that, at a given pressure and at a given temperature, the vapours standing over a liquid are of the character which corresponds to the composition of the liquid. In the separation column every bottom plate must, therefore, be of such construction and act in such a manner that it fulfills this theoretical condition. It is, therefore, not only necessary to prepare the bottom plates of the column very carefully in the workshop but to ensure further that they preserve their character when in the service. A slight alteration of the accurate horizontal position of the bottom plates is sufficient to change this condition.

All this had not been really understood up to the present and this is the reason why the distillation and rectifying columns of known type have not given the highest possible degree of efficiency.

This invention solves the problem by conducting the liquid over the bottom plates of the separation column in a peculiar manner. On one bottom plate of circular form the liquid is conducted from the circumference in a uniform layer towards an opening at the centre and on the next following bottom plate the liquid is conducted inversely from the centre in a uniform layer towards the circumference. The vapours generated from the liquid will therefore be, on each bottom plate and at all points, uniformly in touch with the liquid. On the other hand there are no corners or surfaces over which the liquid does not flow directly, where liquid might collect which has a different composition than the liquid which is permanently in movement. The liquid is forced to flow all over the bottom plates in uniform repartition so that it opposes to the traversing vapours equal resistance or equal pressure head at any point. It is further necessary to enlarge the surfaces as much as possible for a given diameter of the bottom plates. With this object in view rows of elements spaced at uniform distances are arranged on the bottom plates said elements being designed to separate the vapours from the liquid, said vapours being generated from the liquid when it flows towards or away from the centre of the bottom plate, and said elements force the vapours to repeatedly change the direction of flow. These elements consist of tubes projecting through the bottom plates and having hoods over the top ends, said hoods being sunk into the corresponding bottom plate, the tubes serving to regulate the flowing over of the liquid from one stage to the other, the vapours passing from the said tubes under the hoods to flow off under the lower edge of the hood so that the direction of flow is changed. As has been stated above it is essential to make the vapours filter, in the finest possible repartition, through the layer of liquid on the bottom plate. In this regard it is important that the flowing over of the vapours from the hoods be controlled in such a manner that as tiny gas bubbles are formed as possible, said gas bubbles traversing the liquid to collect above the upper surface of the liquid which is thus raised, wherefrom results the "boiling" effect. The shape of the apertures in the hoods plays an essential part in the production of the gas bubbles. All this will be hereinafter explained with reference to the accompanying drawings which give a diagrammatical and consequently distorted illustration of the invention.

Figs. 2 and 3 show in plan view two adjacent bottom plates.

Figs. 4 to 8 show various forms of construction of the separation elements.

Figure 1:
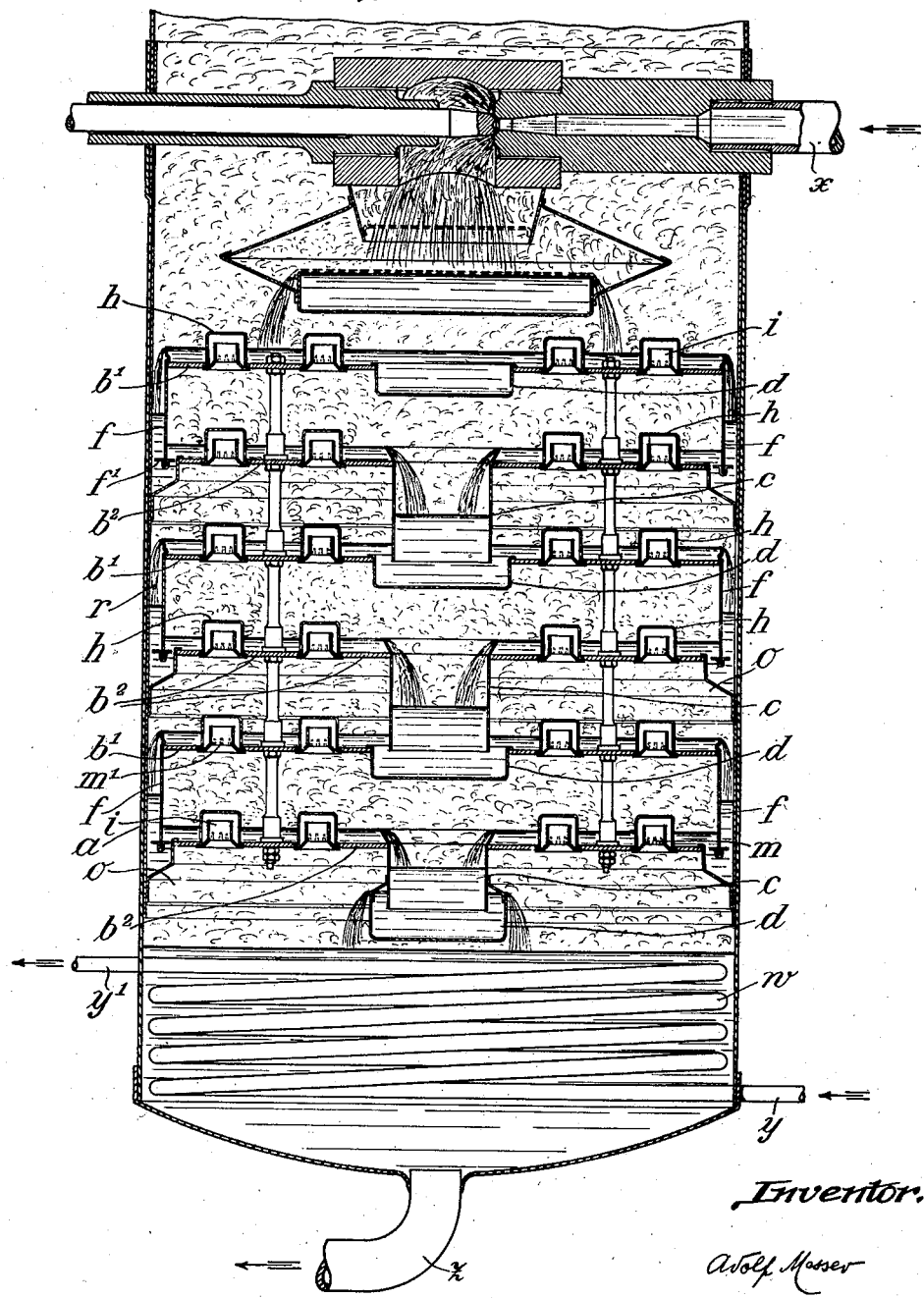
Fig. 1 shows in longitudinal section a portion of a separation column.

The cylindrical column $a$ comprises two groups of bottom plates $b^1$, $b^2$ alternating regularly. The bottom plate $b^1$ has at the centre a tubular cup $d$ into which dips the central overflow tube $c$ from the next higher bottom plate $b^2$. The bottom plate $b^1$ has on its circumference a vertical overflow flange $f$ the downwardly directed extension $f^1$ of which encloses at some distance the downwardly directed flange $o$ of the next lower bottom plate $b^2$. The flange $o$ of bottom plate $b^2$ forms at its lower end underneath the lower edge of flange $f^1$ a horizontal partition connected with the casing of the column $a$.

In each bottom plate $b^1$ and $b^2$ a very great number of tubes $i$ are mounted, only a few tubes $i$ being shown in the drawing. These tubes $i$ are all of accurately the same size and they are mounted at uniform distances apart. A hood $h$ is placed over each tube $i$. The lower edges of the hoods $h$ are sunk into the corresponding bottom plate and each hood has apertures at a short distance above its lower edge.

The liquid which supplied from the supplying pipe $x$ flows into the upper central tube $e$ fills first the cup $d$ of the upper bottom plate $b^1$ to rise on this bottom plate to the upper edge of flange $f$, over which it flows into the annular space between the flange $f$, $f^1$ and the inner surface of the wall of casing $a$, the bottom of this annular space being formed by the end of the downwardly directed flange $o$ of the next lower bottom plate $b^2$. On this flange $o$ the liquid rises inside the flange $f^1$ to the upper edge of the overflow tube $e$ mounted in the central aperture of the bottom plate $b^2$. Through this tube $e$ the liquid flows into the cup $d$ of the second bottom plate $b^1$ and so forth from stage to stage. The liquid flows on the bottom plates $b^1$ from the centre towards the circumference and on the bottom plates $b^2$ from the circumference towards the centre. The vapours generated from the liquid, heated by means of a serpentine pipe $w$ through which the heating medium flows from the lower end $y$ to the upper outlet end $y'$ ascend into the tubes $i$ of the next higher bottom plate and over the top edges of these tubes under the corresponding hoods to descend in the interval between the outer surface of the tube $i$ and the inner surface of the corresponding hood $h$ to escape through the apertures in the hoods directly above the bottom plate. At this point the fine repartition of the vapours takes place by the formation of the tiniest possible bubbles. A discharge pipe $t$ at the bottom end of the casing $a$ serves to discharge the condensate.

The square shape of the apertures $m^1$, shown in Fig. 7 is the least favourable owing to the sudden widening of the aperture. The rectangular shape of the apertures $m^2$, Fig. 5, or the circular shape of the apertures $m^3$ shown in Fig. 8 are better. The apertures $m^4$ shown in Fig. 4 consisting of a lower row of large apertures and of an upper row of smaller apertures is very favourable for the fine repartition of the vapours. The best shapes for the outflow apertures are however the wedge shape getting narrower towards the upper end as in the apertures $m^6$ shown in Fig. 6 and the slender wedge shape of the apertures $m$ shown in Fig. 1.

The vapour bubbles collect above the surface of the liquid and they produce in the liquid the phenomena of "boiling". The vapours ascend into the tubes $i$ of the next higher bottom plate. Squirting of the boiling liquid to the next higher bottom plate is avoided.

I claim:—

An apparatus for separating liquids into constituents possessing a low boiling point and constituents possessing a high boiling point by distillation and rectification, comprising in combination a vertical cylindrical casing, several separate vertical central tubes in said casing and open at both ends, a cup under the lower end of each central tube, a ring-shaped bottom plate fixed on the top end of each cup, a vertical overflow flange on the circumference of said bottom plate and extended in downward direction, a second ring-shaped bottom plate fixed on the top portion of each central tube at a certain distance from the top edge of said tube, a downwardly directed flange on the circumference of said upper bottom plate the lower end of said flange being bent outward and fixed on the inner surface of said casing and being situated a short distance underneath the edge of the downwardly directed extension of said vertical overflow flange of the lower bottom of the next higher central tube, a great number of vertical tubes open at the upper and lower end inserted in each bottom plate said tubes being all of the same size and arranged in concentric circles and all at the same uniform distance apart in each bottom plate and designed to collect the vapours which ascend from the liquid on the next lower bottom plate, and hoods higher and of greater diameter than said vapour tubes one hood over each vapour tube and fixed at the lower end on the corresponding bottom plate each hood having slots at a short distance above its lower end and designed to make the collected vapours flow into the liquid on said bottom plate.

In testimony whereof I affix my signature.

ADOLF MESSER.